H. H. SCHRAMM.
TIRE.
APPLICATION FILED JUNE 25, 1918.
1,310,300.
Patented July 15, 1919.
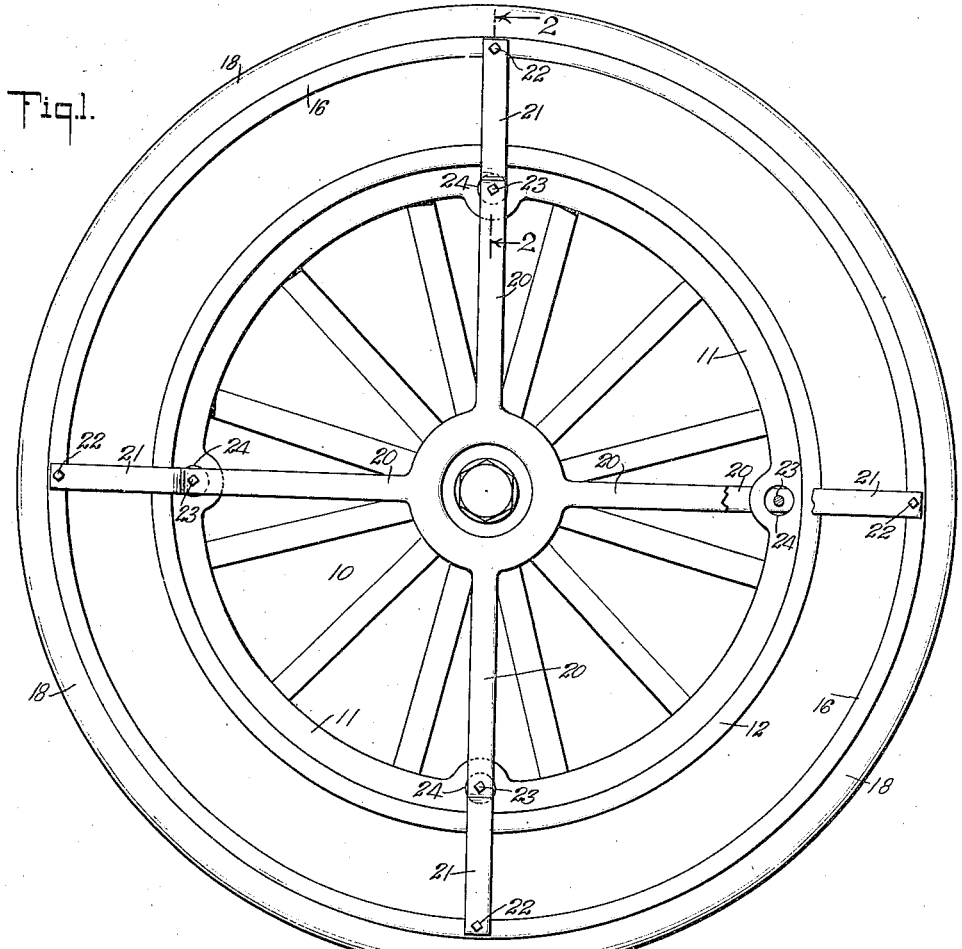
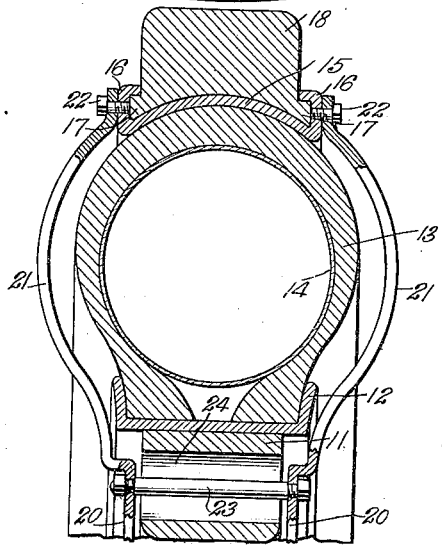
WITNESSES
Frederick Diehl.
Rev. G. Hosler
INVENTOR
Hugh H. Schramm
BY
ATTORNEYS

UNITED STATES PATENT OFFICE.

HUGH H. SCHRAMM, OF NEW YORK, N. Y.

TIRE.

1,310,300.　　　　　　　　Specification of Letters Patent.　　Patented July 15, 1919.

Application filed June 25, 1918. Serial No. 241,858.

*To all whom it may concern:*

Be it known that I, HUGH H. SCHRAMM, a citizen of the United States, and a resident of the city of New York, borough of Manhattan, in the county and State of New York, have invented a new and Improved Tire, of which the following is a full, clear, and exact description.

The invention relates to vehicle wheels provided with pneumatic cushions, and its object is to provide a new and improved tire arranged to render the tire puncture-proof. Another object is to provide the desired cushioning effect and to permit of conveniently assembling or disassembling the parts of the tire.

With these and other objects in view, the invention consists of certain novel features of construction as hereinafter shown and described and then specifically pointed out in the claims.

A practical embodiment of the invention is represented in the accompanying drawings forming a part of this specification in which similar characters of reference indicate corresponding parts in both views.

Figure 1 is a side elevation of a wheel provided with the improved tire, parts being broken out; and Fig. 2 is an enlarged transverse section of the same on the line 2—2 of Fig. 1.

The wheel 10 on which the tire is shown applied is provided with a suitable felly 11 carrying a rim 12 on which is mounted a pneumatic cushion preferably in the form of a shoe 13 containing an inflatable inner tube 14.

On the peripheral face of the shoe 13 is seated a protecting member 15 preferably made of metal and ring-shaped and arched in transverse section to conform to the shoe 13, as will be readily understood by reference to Fig. 2. The protecting member 15 is provided at the sides with flanges 16 engaged by flanges 17 formed on the sides of a tread 18, preferably made of rubber or other suitable material. It will be noticed that by the arrangement described the pneumatic cushion is a distance remote from the surface of the roadway on which the wheel is traveling so that nails and similar articles are not liable to reach and injure the pneumatic cushion. Any nails or similar articles engaging the tread 18 are prevented from reaching the pneumatic cushion owing to the metallic protecting member 15 interposed between the tread 18 and the shoe 13. From the foregoing it will be seen that by the arrangement described the tire is practically rendered puncture-proof.

In order to prevent the tread 18 and the protecting member 15 from moving transversely and from creeping in a longitudinal direction use is made of retaining members 20 preferably in the form of spiders arranged in close proximity to the front and rear faces of the wheel 10. The outer ends 21 of the retaining members 20 are curved or bent to pass spaced from the front and rear of the pneumatic cushion and the terminals of the ends 21 are fastened by bolts 22 or other fastening devices to the flanges 16 of the protecting member 15. It will be noticed that by the construction described the retaining members 20 owing to their close proximity to the front and rear faces of the wheel 10 hold the protecting member 15 and its tread 18 against transverse movement on the shoe 13 of the pneumatic cushion. The retaining members 20 have their spider arms connected with each other by transverse bolts 23 extending through openings 24 formed in the felly 11 to hold the said retaining members against turning thus preventing the protecting member 15 and its tread 18 from creeping on the shoe 13 of the pneumatic cushion.

By the arrangement described, the pneumatic cushion is free to yield without being hindered by the retaining members 20 and the protecting member 15 carrying the tread 18 and hence the desired cushioning effect is maintained. At the same time the tire is rendered puncture-proof and the pneumatic cushion is not subjected to undue wear especially as it does not come in contact with the roadway. In case the tread 18 should wear down or become injured from any cause whatever it can be readily replaced by a new one without affecting the pneumatic cushion.

Having thus described my invention, I claim as new and desire to secure by Letters Patent:—

1. A vehicle wheel, comprising a hub, spokes, a felly, a rim, a pneumatic cushion on the rim, spiders mounted on the hub on opposite sides of the wheel and having their arms extending on opposite sides of the cushion, an annular flanged tread carrying member resting on the cushion and to which the outer ends of the arms of the spiders are secured, and means for securing the said arms together and loosely to the felly of the wheel.

2. A vehicle wheel, comprising a hub, spokes, a felly provided with enlargements and apertures at said enlargements, a rim, a pneumatic cushion on the rim, spiders mounted on the hub on opposite sides of the wheel, the arms of the spiders being arched and extending on opposite sides of the wheel, an annular flanged tread carrying member resting on the cushion and to which the outer ends of the arms of the spiders are secured and bolts passing through the said arms and through the apertures of the rim.

HUGH H. SCHRAMM.

Copies of this patent may be obtained for five cents each, by addressing the "Commissioner of Patents, Washington, D. C."